United States Patent

Mueller et al.

[15] 3,670,028
[45] June 13, 1972

[54] PRODUCTION OF 2-METHYL-2-HEPTEN-6-ONE

[72] Inventors: Herbert Mueller, Frankenthal/Upper Palatinate; Harald Koehl; Horst Pommer, both of Ludwigshafen/Rhine, all of Germany

[73] Assignee: Badische Anilin-& Soda-Fabrik Aktiengesellschaft, Ludwigshafen/Rhine, Germany

[22] Filed: Sept. 20, 1968

[21] Appl. No.: 761,328

[52] U.S. Cl. .................................................. 260/593
[51] Int. Cl. ................................................. C07c 49/20
[58] Field of Search ............................ 260/593, 593 R

[56] References Cited

FOREIGN PATENTS OR APPLICATIONS 1,112,731  8/1961  Germany .......................... 260/593 R
1,267,682  5/1968  Germany .......................... 260/593 R

OTHER PUBLICATIONS

Meinwald et al., " J. Amer. Chem. Soc." Vol. 80, pp. 5266–5270.

*Primary Examiner*—Bernard Helfin
*Assistant Examiner*—W. B. Lone
*Attorney*—Johnston, Root, O'Keefe, Keil, Thompson & Shurtleff

[57] ABSTRACT

The production of 2-methyl-1-hepten-6-ones (important for organic syntheses of perfumes and carotenoids) by isomerization of 2-methyl-1-hepten-6-one by means of finelly divided palladium or compounds of divalent palladium as isomerization catalysts.

9 Claims, No Drawings

PRODUCTION OF 2-METHYL-2-HEPTEN-6-ONE

The present invention relates to a new process for the production of 2-methyl-2-hepten-6-one (I).

It is generally known that olefinically unsaturated carbonyl compounds can be isomerized by displacement of the C=C double bonds using various compounds having catalytic activity or by thermal treatment.

Attempts made hitherto to isomerize 2-methyl-1-hepten-6-one (II) into 2-methyl-2-hepten-6-one (I) have proved to be very unsatisfactory because of numerous secondary reactions. Thus for example in the isomerization of (II) with sulfuric acid, mainly carbocyclic compounds are obtained instead of (I) (cf. Journal of the American Chemical Society, 80 (1958, page 5,266).

It is therefore the object of the present invention to make 2-methyl-2-hepten-6-one (I) more easily accessible than hitherto.

We have now found that 2-methyl-1-hepten-6-one can unexpectedly be isomerized in outstanding yields by using as the isomerization catalyst for the purpose finely divided metallic palladium or a compound of divalent palladium.

The palladium may be in the form known as palladium black or as a precipitate or carrier substances such as active carbon, barium sulfate or silica gel.

Palladium (II) oxide and the halides such as the fluoride, chloride, bromide and iodide are particularly suitable as compounds of divalent palladium. Complexes of the halides with zerovalent ligands and particularly those containing basic N or P atoms in the molecule are, however, also suitable. Examples of such ligands are $\alpha,\alpha'$, dipyridyl, benzonitrile and triphenylphosphine.

The amount of palladium or palladium(II) compound required is generally from 0.01 to 5% by weight, preferably 0.1 to 2% by weight, with reference to the amount of (II). It is possible to use larger or smaller amounts of catalyst, however, in which case the isomerization is accelerated or retarded.

The reaction may be carried out at temperatures of 100° to 250° C, preferably from 150° to 200° C, at atmospheric or superatmospheric pressure, for example up to 50 atmospheres, with or without solvent, batchwise or continuously.

Hydrocarbons which are liquid under the reaction conditions concerned, for example hexane, heptane, petroleum ether, petrol, benzene, toluene or xylene, are particularly suitable as solvents; ethers such as diphenyl ether, 2,2'dimethoxy diethyl ether and 2,2'-diethoxy diethyl ether may also be used.

After the isomerization is over, the reaction mixture may be worked up as usual, preferably by distillation.

The product (I) of the process is a valuable intermediate for organic syntheses, particularly for the production of compounds of the carotenoid series and perfumes.

The invention is illustrated by the following Examples.

EXAMPLE 1

1 g of palladium black is added to 100 g of 2-methyl-1-hepten-6-one, the mixture is heated for 6 hours at 160° C at atmospheric pressure and worked up in the conventional manner.

Pure 2-methyl-2-hepten-6-one is obtained in a 96.5% yield. It has a boiling point of 171° C at 760 torr; $n^{25}= 1.4387$.

EXAMPLE 2

1 g of palladium(II) chloride is added to 100 g of 2-methyl-1-hepten-6-one, the mixture is heated for 4 hours at atmospheric pressure at 150° C and then worked up in the usual way.

Pure 2-methyl-2-hepten-6-one is obtained in an 81.4% yield.

We claim:

1. A process for the production of 2-methyl-2-hepten-6-one which comprises isomerizing 2-methyl-1-hepten-6-one by means of finely divided metallic palladium or a compound of divalent palladium selected from the group consisting of palladium (II) oxide, palladium (II) halide, a complex of a palladium halide with $\alpha,\alpha$-dipyridyl as a zerovalent ligand, a complex of a palladium halide with benzonitrile as a zerovalent ligand and a complex of a palladium halide with triphenylphosphine as a zerovalent ligand as an isomerization catalyst at a temperature of from 100 to 250° C.

2. A process as in claim 1, wherein said catalyst is palladium black.

3. A process as in claim 1, wherein said catalyst is a palladium(II) halide.

4. A process as in claim 1, wherein said catalyst is palladium(II) oxide.

5. A process as in claim 1, wherein said catalyst is palladium(II) chloride.

6. A process as in claim 1, wherein the amount of catalyst used is 0.01 to 5% by weight with reference to the amount of 2-methyl-1-hepten-6-one.

7. A process as in claim 1, wherein the amount of catalyst used is 0.1 to 2% by weight with reference to the amount of 2-methyl-1-hepten-6-one.

8. A process as in claim 1, wherein the temperature is from 150° to 200° C.

9. A process as in claim 1, wherein said isomerization is carried out in a hydrocarbon which is liquid under the reaction conditions.

* * * * *

PO-1050
(5/69)

UNITED STATES PATENT OFFICE
CERTIFICATE OF CORRECTION

Patent No. 3,670,028   Dated June 13, 1972

Inventor(s) Herbert Mueller, Harald Koehl, and Horst Pommer

It is certified that error appears in the above-identified patent and that said Letters Patent are hereby corrected as shown below:

First page, left-hand column, "Upper Palatinate" should read
-- Pfalz --; left-hand column, insert
-- [30]      Foreign Application Priority Data
   September 22, 1967   Germany..........P 12 67 682.3 --.

Column 1, line 5, "C  C" should read --  $C≡C$  --.

Signed and sealed this 19th day of December 1972.

(SEAL)
Attest:

EDWARD M. FLETCHER, JR.   ROBERT GOTTSCHALK
Attesting Officer         Commissioner of Patents